US006868882B2

(12) United States Patent
Gillard et al.

(10) Patent No.: US 6,868,882 B2
(45) Date of Patent: Mar. 22, 2005

(54) BELT PACKAGE FOR SUPER SINGLE TRUCK TIRES

(75) Inventors: Jean-Michel Gillard, Arlon (BE); Jean-Nicolas Helt, Mont-Saint-Martin (FR); Christian Jean-Marie Roger Bawin, Saint-Georges sur-Meuse (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 116 days.

(21) Appl. No.: 10/411,510

(22) Filed: Apr. 10, 2003

(65) Prior Publication Data

US 2003/0201050 A1 Oct. 30, 2003

Related U.S. Application Data

(63) Continuation-in-part of application No. 10/132,635, filed on Apr. 24, 2002, now Pat. No. 6,619,357.

(51) Int. Cl.[7] .............................. B60C 9/20; B60C 9/22
(52) U.S. Cl. ....................... 152/531; 152/526; 152/533; 152/534
(58) Field of Search ................................ 152/526, 531, 152/533, 534

(56) References Cited

U.S. PATENT DOCUMENTS 5,383,507 A  *  1/1995  Sato et al. ............... 152/533 X
5,616,195 A  *  4/1997  Marquet et al. ......... 152/526 X
6,619,357 B1 *  9/2003  Gillard et al. ............. 152/531

FOREIGN PATENT DOCUMENTS

| DE | 4208705 A1 | 9/1992 |
| EP | 0297889 A2 | 1/1989 |
| EP | 1112098 A2 | 8/2001 |
| FR | 2 285 255 * | 4/1976 |
| FR | 2566334 A1 | 12/1985 |
| GB | 2064445 A | 6/1981 |

* cited by examiner

Primary Examiner—Adrienne C. Johnstone
(74) Attorney, Agent, or Firm—Richard B. O'Planick; David L. King

(57) ABSTRACT

A medium truck tire (10) and more specifically a super single truck tire (10) includes belt plies (24, 25) reinforced with steel cords which make an angle comprised between 0° and 5° with respect to the equatorial plane. At least one belt ply (24, 25) is helically wound on the carcass ply (16). The steel of the reinforcing cords comprises high elongation steel. Radially outside to the at least one helically wound belt ply (24, 25), there are several spliced belt plies (22, 23), making angles comprised between 45° and 75° with respect to the equatorial plane.

10 Claims, 5 Drawing Sheets

BELT PACKAGE FOR SUPER SINGLE TRUCK TIRES

This application is a continuation-in-part of Ser. No. 10/132,635, filed Apr. 24, 2002, which issued as U.S. Pat. No. 6,619,357 on Sep. 16, 2003.

FIELD AND BACKGROUND OF THE INVENTION

The present invention relates to truck tires, preferably super single radial truck pneumatic drive tires.

Super single tires, which are wide base low aspect ratio truck tires replacing two small base tires, so-called dual mounted tires, have been used for years on trailers. Such tires are usually of size 385/65R22,5 or 385/55R22,5 and have a maximum load-carrying capacity of 4,5 metric tons.

Over the years these wide base tires appeared more and more on trucks in the steering position because they had a higher mileage.

Recently it became of interest to use also super single tires in the drive positions. Tires in the drive position have to bear part of the trailer load and must have an increased load capacity. Tire standards define a load capacity of 5,8 metric tons and a maximum speed of 110 km/h. These tires have very low aspect ratios and are usually of size 495/45R22.5. Drive tires are exposed to harsh service conditions and conventional constructions show crown area durability problems. Furthermore the pressure distribution through the elastomeric blocks in the footprint lacks the required uniformity.

GB-A-1 567 614 discloses a pneumatic tire particularly suitable for heavy vehicles. Radially outwards of the belt layers there is at least one layer comprising metallic cords parallel to one another and substantially parallel to the circumferential direction. The metallic cords have an ultimate elongation between 4 and 8%. In a preferred embodiment the layers of extensible metallic cord are formed by a single helically wound cord.

It is known from LU-A-85 964 to wind a ribbon reinforced with cords helically in at least two layers on top the belt plies of a passenger tire. The ribbon has a width comprised between 15 and 45 mm. The reinforcing cords are preferably of nylon and have a lateral density of about 30 EPI.

FR-A-2 285 255 discloses a crown reinforcing structure for pneumatic tires including a helically wound ribbon reinforced with steel cords. The ribbon has a width comprised between 5 and 50 mm and is directly wound on the carcass ply.

SUMMARY OF THE INVENTION

It is an object of the present invention to provide a super single radial truck tire having a crown reinforcement giving improved crown area durability.

A further object of the present invention is to provide a super single radial truck tire having a crown reinforcement resulting in an improved footprint shape and footprint pressure distribution.

Yet another object of the present invention is to provide a super single radial truck tire having excellent high speed properties and improved wear properties.

Still, another aspect of the present invention is to provide a radial super single radial truck tire optimizing the trade-off between handling and durability.

A pneumatic medium truck tire of the invention comprises at least one pair of parallel annular beads, at least one carcass ply wrapped around said beads, three to six belt plies disposed over the at least one carcass ply in a crown area of the tire, a tread disposed over the belts, and sidewalls disposed between the tread and the beads. At least one of the radially inner belt plies is obtained by helically winding an elastomeric ribbon reinforced with high elongation steel cords.

In various embodiments of the invention, the helically wound belt plies are reinforced with high elongation steel cords having the construction 3×7×0.22.

Specific constructions of such tires are also claimed.

DEFINITIONS

As used herein and in the claims, the terms "aspect ratio" means the ratio of the tire's section height to its section width;

"axial" and "axially" refer to directions which are parallel to the axis of rotation of a tire;

"radial" and "radially" refer to directions that are perpendicular to the axis of rotation of a tire;

"bead" refers to that part of a tire comprising an annular tensile member, the bead core, wrapped by ply cords and shaped, with or without other reinforcement elements to fit a designed tire rim;

"belt" or "belt ply" refers to an annular layer or ply of parallel cords, woven or unwoven, underlying the tread, not anchored to the bead, and having cord angles of from 0□ to 80□ with respect to the EP of the tire;

"carcass" refers to the tire structure apart from the belt structure, tread, undertread, and sidewall rubber but including the beads, (carcass plies are wrapped around the beads);

"circumferential" refers to lines or directions extending along the perimeter of the surface of the annular tread perpendicular to the axial direction;

"crown" refers to substantially the outer circumference of a tire where the tread is disposed;

"equatorial plane (EP)" refers to a plane that is perpendicular to the axis of rotation of a tire and passes through the center of the tire's tread;

"footprint" refers to the contact patch or area of contact of the tire tread with a flat surface at zero speed and under normal load and pressure or under specified load, pressure and speed conditions;

"ply" means a continuous layer of rubber coated parallel cords;

"section height" means the radial distance from the nominal rim diameter to the outer diameter of the tire at its equatorial plane;

"section width" means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands;

"spliced belt ply" refers to a ply that has the lateral sides extending across the whole lateral width of the belt, the circumferential ends being spliced and overlapping, forming a lap-splice or a butt-splice;

"super single tire" refers to a tire which replaces dual mounted tires on a specific axle; they are low aspect ratio tires and have a section width exceeding the section width of one of the previously dual mounted tires but inferior to the dual assembly width;

"tread width (TW)" means the arc length of the tread surface in the axial direction, that is, in a plane passing through the axis of rotation of the tire.

DETAILED DESCRIPTION OF THE INVENTION

Figure 1:
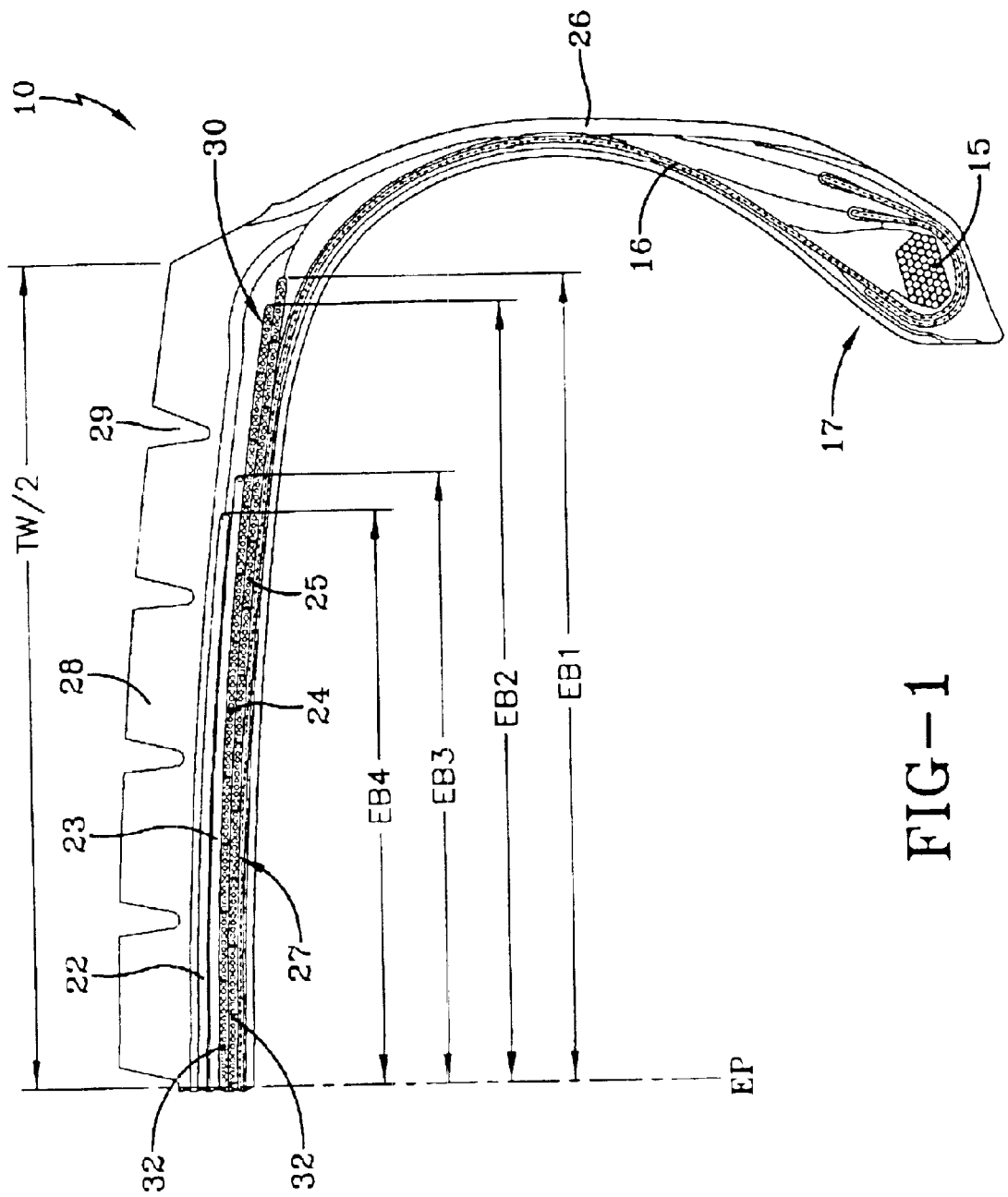
FIG. 1 is a cross-sectional view of half a tire according to a first embodiment of the invention taken in a plane that contains the axis of rotation of the tire.

With reference to FIG. 1, a preferred embodiment of the invention is illustrated. The pneumatic tire 10 comprises a pair of substantially parallel annular bead cores 15 located in beads 17 and a carcass ply 16. The carcass ply is wrapped over bead cores 15 such that reinforcement cords make an angle of between 75° and 90°, preferably about 90□ with respect to the equatorial plane (EP) of the tire. Each bead comprises an apex, reinforcing plies such as chippers and flippers and gum strips as is well known in the tire art. A tread 28 comprising grooves 29 is disposed over a crown reinforcing or belt structure 27 and sidewalls 26 are arranged between the tread 28 and the beads 17. The carcass ply and belt plies, as is common in the art, are reinforced with substantially parallel longitudinal reinforcing members.

The crown reinforcing structure 27 comprises spliced belts plies 22 and 23 reinforced with steel cords. The radially outer belt ply 22 is reinforced with steel cords making an angle comprised between 45° and 75° (in abbreviation 45R and 75R) and preferably between 55° and 65° (55R and 65R) with respect to the equatorial plane (EP). The neighboring radially inner belt ply 23 is reinforced with steel cords making an angle comprised between −45° and −75° (in abbreviation 45L and 75L) and preferably between −55° and −65° (55L and 65L) with respect to the equatorial plane (EP). Generally the steel cords in these two radially outer belt plies have the same inclination but opposed angles with respect to the equatorial plane (EP) such as 60° for the belt ply 22 and −60° for belt ply 23. In the illustrated embodiment, the steel cords of the belt plies 22 and 23 have a construction of 12×0.35+1×0.15 though other steel cord constructions commonly used in the truck tire belt ply reinforcement field give good results. The steel grades are high tensile. The lateral density of the steel cords is comprised between 8 and 15 ends per inch (EPI) and preferably between 10 and 12 EPI.

Figure 5:
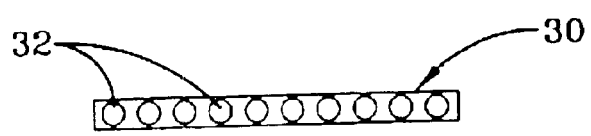
FIG. 5 illustrates an enlarged cross-sectional view of a steel cord reinforced ribbon.

Below belt plies 22 and 23 there is a spirally wound belt structure consisting of at least one spirally wound ribbon 30 and extending transversely at least as far as the edges of the spliced belt plies 22 and 23. The ribbon 30 as illustrated in FIG. 5, is made from elastomeric materials reinforced by cords 32 of steel. The spiral convolutions of the ribbon 30 make an angle of 0□ to 5□ with respect to the equatorial plane (EP) and are in abutment with any adjacent convolution, so as to form a continuous annular ring having a substantially even cord distribution across the axial width of the structure. The ribbon 30 has a thickness of about 2.5 mm and a width of 5 to 25 mm, and more preferably 8 to 16 mm, and a lateral cord distribution density of at least 8 EPI (ends per inch), preferably at least 10 EPI, and more preferably comprised between 12 and 16 EPI. The steel cords 32 reinforcing the ribbon 30 are made of high elongation steel. Such steel allows an elongation of at least 1.5% and preferably an elongation comprised between 1.6 and 4%. The steel grade giving good results is normal tensile. The steel cord construction as used in the different embodiments is 3×7×0.22.

The spirally wound structure has for smaller tire sizes, or for reinforcing steel cords of great strength, only one annular layer 25. The structure may include a second annular layer 24 located adjacent to and radially outward of the first annular layer 25. Preferably, the second layer 24 has its spiral convolutions on the opposite hand as compared to the winding of the first annular layer so that the cords 32 of each layer cross at a very small angle. With such a construction, the two layers 24, 25 could be wound continuously, in succession, without a break in the ribbon 30.

An alternative to the belt structure 27 (not represented) consists in having the spiral convolutions of the ribbon 30 not in abutment with adjacent convolutions. By varying the spacing between adjacent convolutions the restrictive effect of the annular layer 25 can be tailored to the requirements. By increasing the spacing between adjacent convolutions near the equatorial plane and reducing the spacing near the shoulder portions of the tire 10, the weight and wear balance of the tire may be improved.

Figure 6:
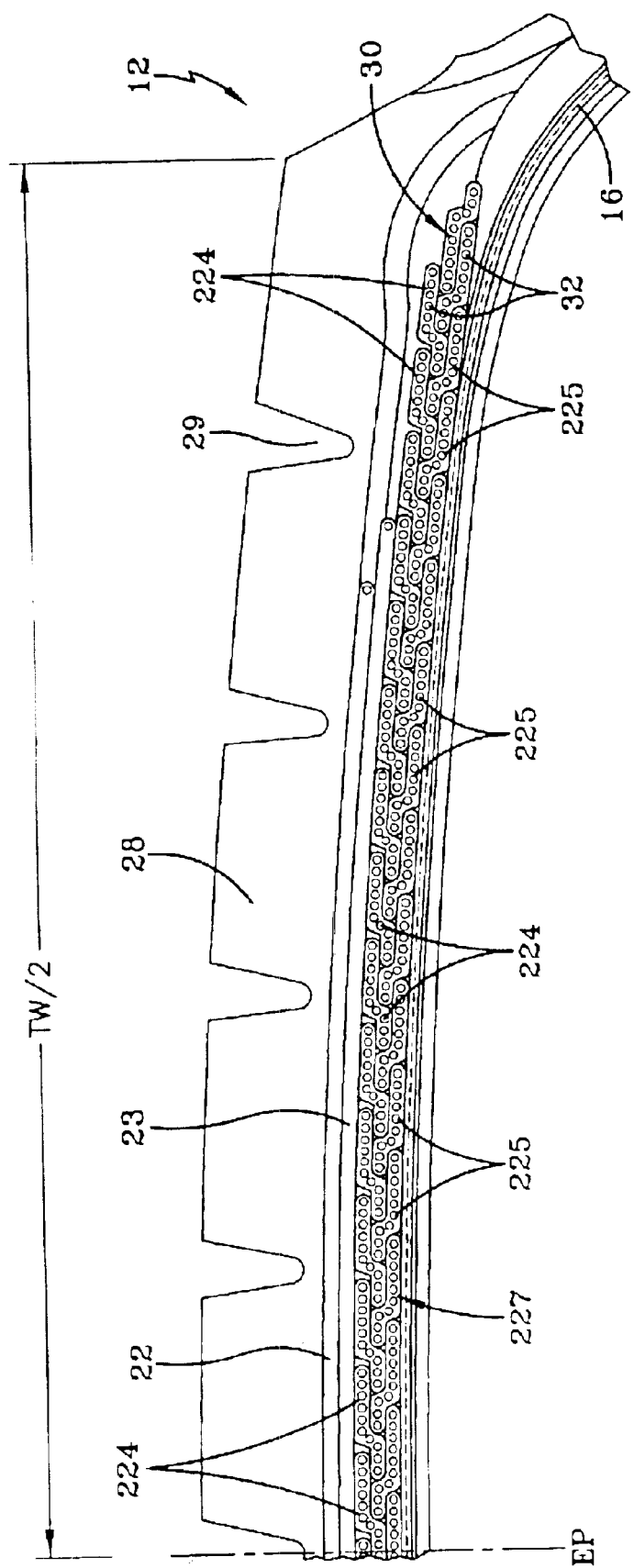
FIG. 6 is a cross-sectional view of half a crown portion of a tire according to a further embodiment the invention taken in a plane that contains the axis of rotation of the tire.

A further embodiment of a belt structure 227 according to the invention is illustrated in FIG. 6, representing a tire 12 wherein the ribbon(s) in the annular layers 224 and 225 have a constant overlapping relationship with one another. The two spliced belts 22 and 23 have reinforcement cords with inclinations with respect to the equatorial plane which are comparable to those in FIG. 1 or 3.

The ribbon 30 can be applied in one single operation or two ribbons having the same or different width can be applied successively. By varying the amount of overlap between adjacent convolutions, different cord densities are possible throughout the axial extent of the reinforcement zone. In any case, it is preferred that the variable concentrations of the reinforcement material is symmetrical with respect to the equatorial plane EP of the tire.

The crown reinforcing structure 27 as shown in FIG. 1 is staggered, meaning that each radially outer belt 22 has a smaller lateral extension than the adjacent radially inner belt 23. The width (EB1) of half the laterally inner helically wound belt 25 may be comprised between 70 and 110% of half the treadwidth (TW/2) and is preferably about 98% of TW/2. The width (EB2) of half the adjacent neighboring helically wound belt 24 may be also comprised between 70 and 110% of half the treadwidth (TW/2) and is preferably about 92% of TW/2. The width (EB3) of half the radially inner belt 23 may be comprised between 70 and 100% of half the treadwidth (TW/2) and is preferably about 74% of TW/2. The width (EB4) of half the radially outer belt 22 may also be comprised between 60 and 100% of half the treadwidth (TW/2) and is preferably about 70% of TW/2.

Figure 2:
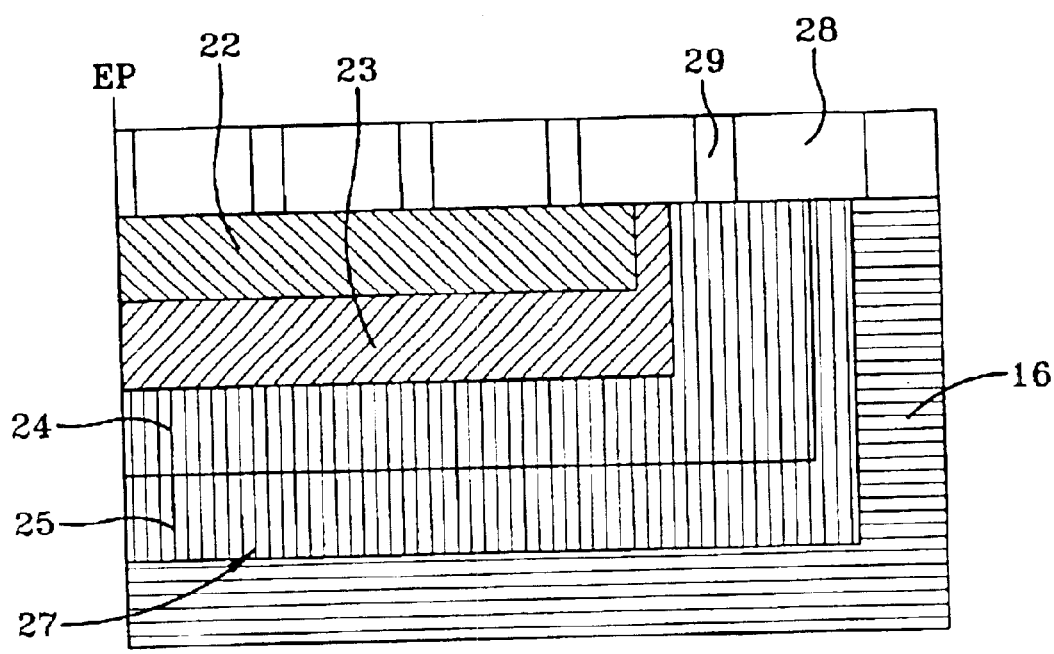
FIG. 2 illustrates a plain view of a portion of the crown reinforcing structure according to the embodiment shown in FIG. 1.
Figure 4:
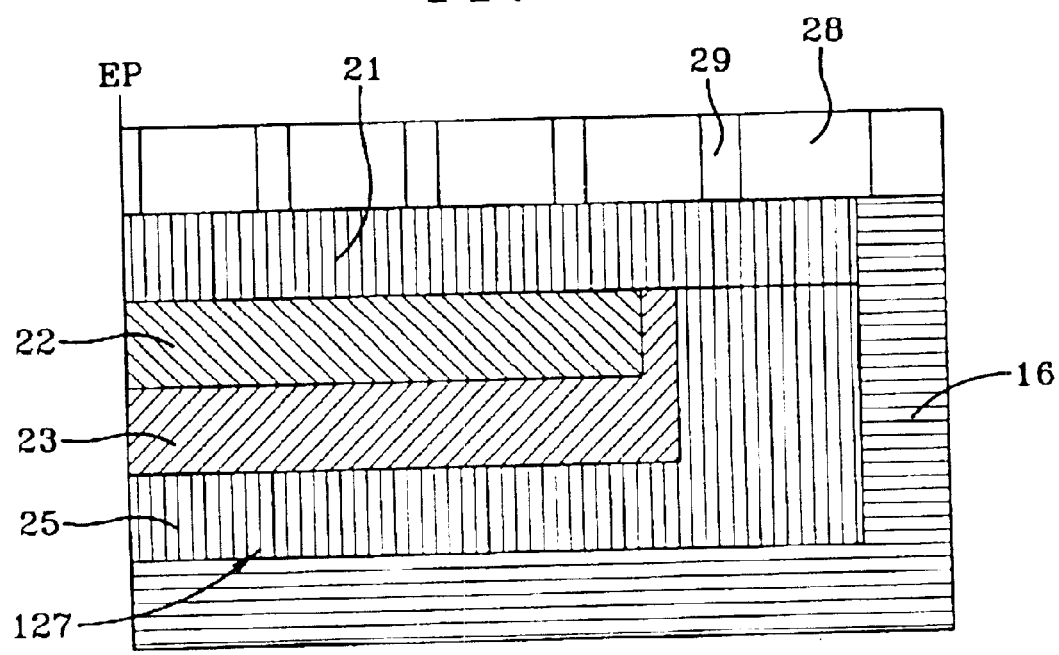
FIG. 4 illustrates a plain view of a portion of the crown reinforcing structure according to the embodiment shown in FIG. 3.

FIG. 2 shows a plan view of the crown reinforcement represented in FIG. 1 where part of the tread 29 has been removed.

Figure 3:
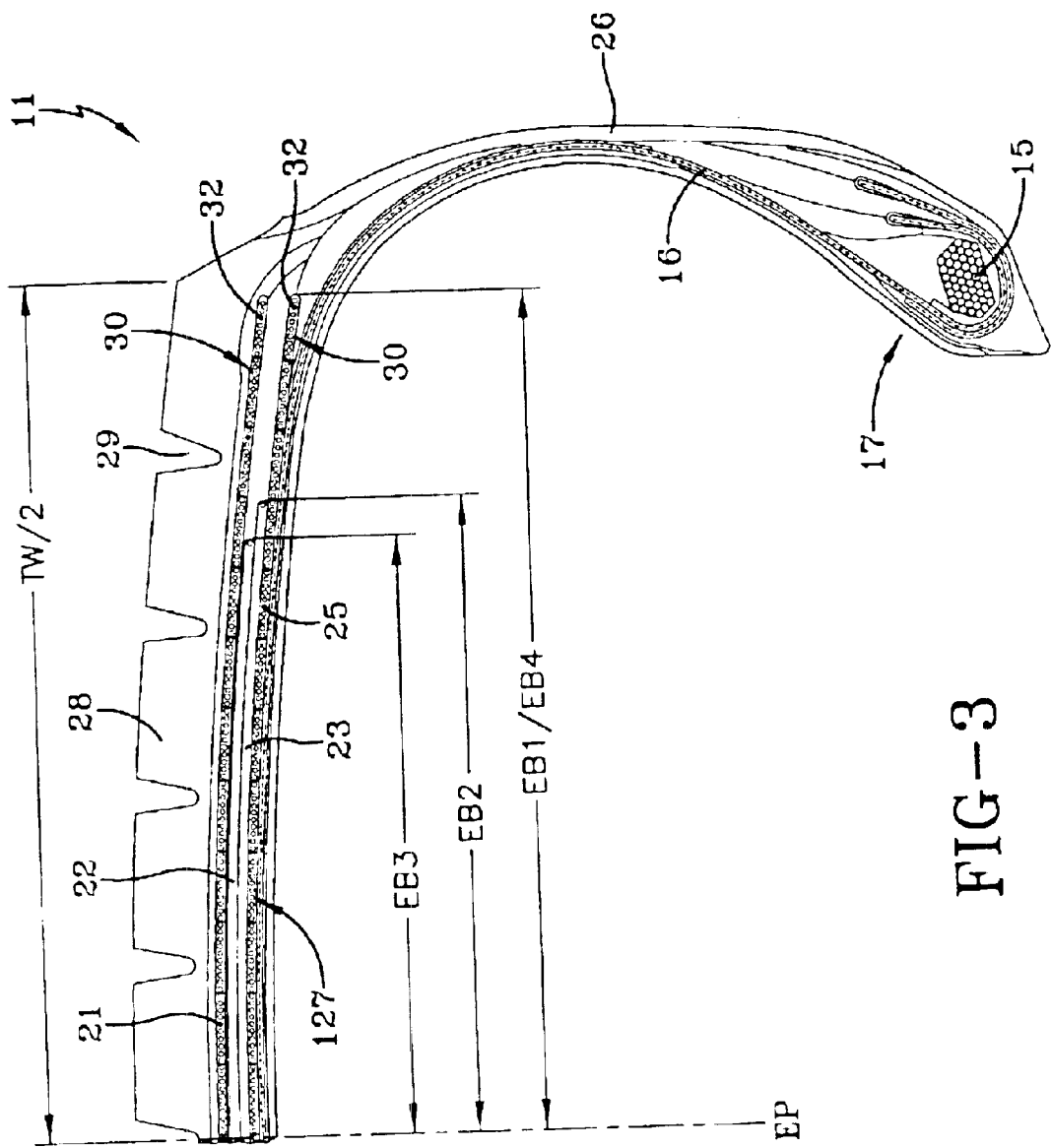
FIG. 3 is a cross-sectional view of half a tire according to a further embodiment of the invention taken in a plane that contains the axis of rotation of the tire.

With reference now to FIG. 3, a further embodiment of the invention is illustrated. Elements throughout the drawing which are similar or identical with elements represented in FIG. 1 are referred to by identical reference numerals.

The crown reinforcing structure 127 of super single tire 11 comprises spliced belt plies 22 and 23 reinforced with steel cords. The radially outer spliced belt ply 22 is reinforced with steel cords making an angle comprised between 45° and 75° and preferably between 55° and 65° with respect to the equatorial plane (EP). The neighboring radially inner spliced ply 23 is reinforced with steel cords making an angle comprised between −45° and −75° and preferably between −55° and −75° with respect to the equatorial plane (EP). The steel cords in the two spliced belt plies 22 and 23 have preferably the same inclination but opposed angles with respect to the equatorial plane (EP) such as 60° for the belt ply 22 and −60° for belt ply 23.

Below the radially inner belt ply 23 there is a spirally wound belt 25 consisting of a spirally wound ribbon 30 and extending transversely at least as far as the edges of the spliced belt plies 22 and 23. The ribbon 30 is made from elastomeric materials reinforced by cords 32 of steel. The spiral convolutions of the ribbon 30 make an angle 0° to 5° with respect to the equatorial plane (EP) and are in abutment with any adjacent convolution, so as to form a continuous annular ring having a substantially even cord distribution across the axial width of the structure.

A second annular layer 21 is spirally wound on the radially outward spliced belt ply 22 and extends transversely at least as far as the edges of the spliced belt plies 22 and 23 and preferably about the same distance as the radially inner belt ply 25.

It is believed possible to further improve the characteristics of such a belt package by modifying and more specifically increasing the shore A hardness of the tread compound above 70 though such increase might result in a tradeoff of other tread properties, like chip-chunk problems and durability.

Tire set 1, of size 495/45R22.5 was made according to the embodiment of the invention represented in FIG. 1 and had more specifically the belt construction 0-0-60R-60L.

Tire set 2, of size 495/45R22.5 was made according to the embodiment represented in FIG. 1 and had more specifically the belt construction 0-0-75R-75L.

Tire set 3 of size 495/45R22.5 was made according to the embodiment represented in FIG. 3 and had more specifically the belt construction 0-60R-60L-0.

Tire set 4 of size 495/45R22.5 was made according to standard truck tire design and had more specifically the belt construction 67R-21R-21L-21R+BER, where BER stands for a spirally wound ribbon on the lateral radially outer belt edges.

The belt ply reinforcing steel grades, cord constructions and EPI in the different sets were chosen identical.

At the time of drafting this patent application, the tires showed the results as indicated in table 1.

TABLE 1

| | TEST RESULTS | | | | |
|---|---|---|---|---|---|
| | Tire 1 | Tire 2 | Tire 3 | Control | Objectives |
| Belt 1 | 0 Deg/wide | 0 Deg/Wide | 0 Deg/wide | 67R | |
| Belt 2 | 0 Deg/wide | 0 Deg/Wide | 60R/narrow | 21R | |
| Belt 3 | 60R/narrow | 75R/narrow | 60L/narrow | 21L | |
| Belt 4 | 60L/narrow | 75L/narrow | 0 Deg/wide | 21R | |
| SWL 1 | 6617 | 9609 | 11205 | 2141 | 5400 |
| END 2 | (78h21) | 95h53 | 100h(*) | 52h00 | 62h00 |
| Light handling test | 6.4 | 6.2 | 6.5 | 6.1 | 6(DUAL) |

1 SWL represents the smooth wheel mileage.
2 END represents the legal endurance test ECE 54.
(*) means that the test was stopped as the tire fulfills the requirements.
(DUAL) means the result of dual mounted tires.

Figure 7:
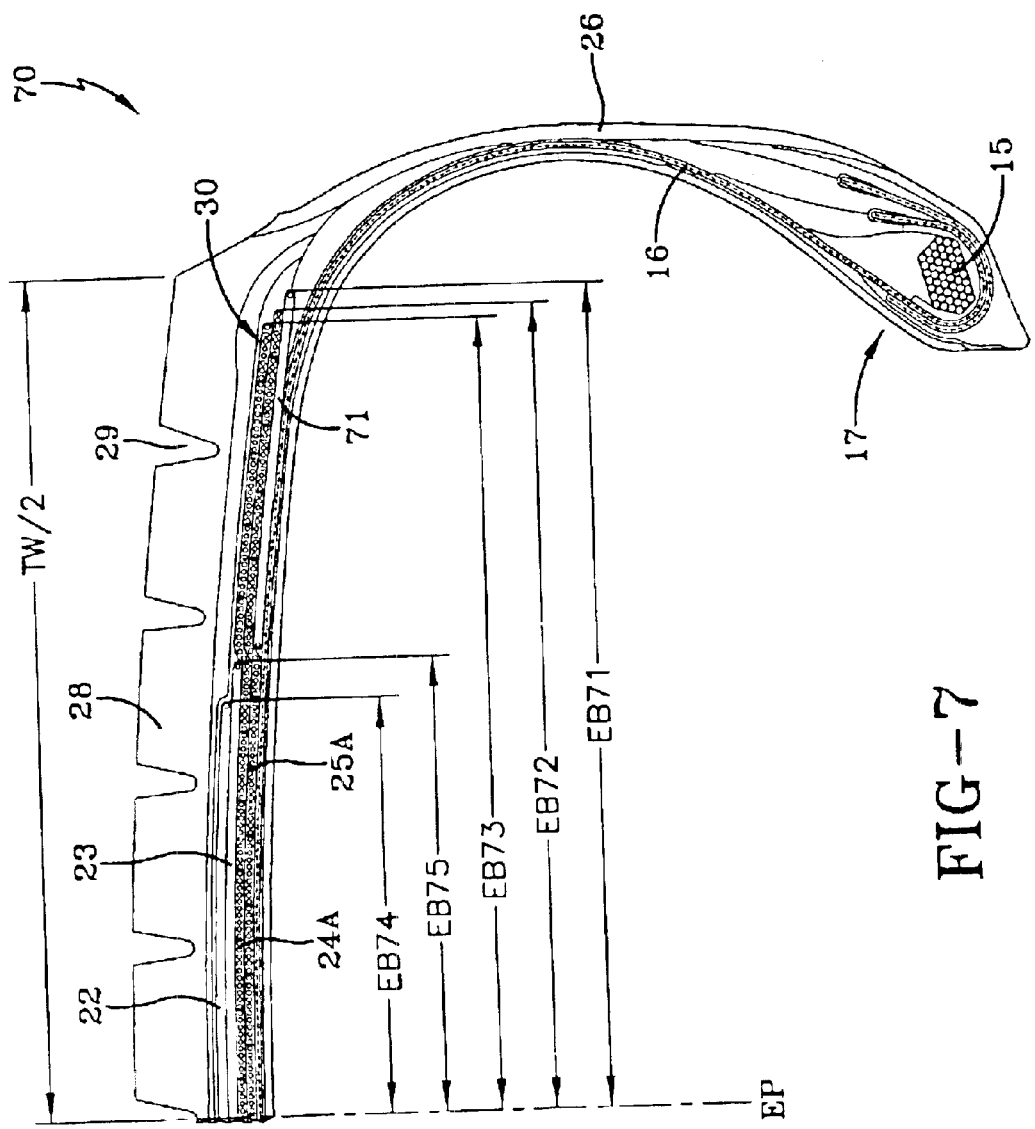
FIG. 7 is a cross-sectional view of half a tire according to a still further embodiment the invention taken in a plane that contains the axis of rotation of the tire.

A still further embodiment of a belt structure according to the invention is shown in FIG. 7. The tire 70 includes a staggered steel belt package made up of four belts, see references 25A, 24A, 23, 22, on top of two steel strips 71. The two strips 71 are adjacent to the shoulders of the tire and equally spaced from the equatorial plane of the tire. The strips are located between the carcass ply 16 and the radially inner helically wound belt ply 25A. The cords reinforcing the shoulder strips form angles comprised between 40 and 80 degrees with respect to the equatorial plane of the tire and preferably between 50 and 70 degrees. The inclination may be to the right R or to the left L, R being preferred. Presently preferred is an inclination of 60 degrees and a steel cord construction of 3×0.365+9×0.34. The lateral spacing of the cords is about 10 EPI. The strip has a width comprised between 10% and 45% of half the tread width TW/2, preferably between 20% and 30% of TW/2. The lateral outer end of the shoulder strip is spaced a distance from the equatorial plane EP of EB71 which is between 70% and 105%, preferably between 80% and 95% of half the tread width TW/2.

The first spirally wound belt ply 25A has an inclination of its reinforcing cords comprised between 0 and 5 degrees with respect to the equatorial plane. The reinforcement comprises high elongation steel cords, having for example a construction 3×7×0.22 and a lateral spacing comprised between 11 and 14 EPI. The belt width 2×EB72 is comprised between 70% and 105% of the tread width TW.

The second spirally wound belt ply 24A has the same steel cord inclination, is reinforced by the same cords and has the same lateral spacing of the steel cords than the first belt ply 25A. The belt width (2×EB73) is comparable to the width of the first belt, slightly smaller being preferred.

The third spliced belt ply 23 is reinforced by steel cords having for instance the construction 3×0.365+9×0.34, which cords have an inclination comprised between 40 and 70 degrees (40L to 70L) with respect to the equatorial plane, an inclination of 50 to 60 degrees being preferred. The lateral spacing of the cords is about 10 EPI. The belt width (2×EB75) is comprised between 40% and 70% of the treadwidth TW, preferably about 50%. There should be no overlap of the axially inner portions of the strips 71 and the axially outer portions of the spiced belt plies 22 and 23.

The fourth spliced belt ply 22 is reinforced as the third belt with the difference that the angles are opposed with respect to the equatorial plane (40R to 70R) as discussed more specifically above in connection with FIG. 1. The belt width (2×EB74) is comparable to but slightly smaller than belt ply 23.

As well known in the truck tire art it is of course possible to provide the crown reinforcement with a radially outer belt ply reinforced with nylon cords, such as nylon monofilament cords. The outer belt ply has as prime objective to protect the steel cords from humidity and to protect the crown reinforcing structure during the different steps of a retreading operation, such as tread buffing.

While the invention has been specifically illustrated and described, those skilled in the art will recognize that the invention may be variously modified and practiced without departing from the spirit of the invention. The scope of the invention is limited only by the following claims.

What is claimed is:

1. A pneumatic super single radial truck tire (10) having at least one pair of parallel annular beads (17), at least one carcass ply (16) wrapped around said beads, a crown reinforcing structure comprising adjacent spliced belts plies (22, 23) reinforced with steel cords and at least one helically wound belt ply (24, 25) reinforced with straight high elongation steel cords, disposed over said at least one carcass ply in a crown area of said tire, a tread (28) disposed over said crown reinforcing structure, and sidewalls (26) disposed between said tread and said beads, characterized in that said at least one helically wound belt ply (24, 25) is located between the at least one carcass ply and the radially innermost spliced belt ply; and wherein two strips (71) are located between the at least one carcass ply (16) and the radially inner helically wound belt ply (25A), the cords reinforcing the strips (71) forming angles comprised between 40 and 80 degrees with respect to the equatorial plane of the tire (EP), the strip having each a width comprised between 10% and 45% of half the tread width TW/2, and the lateral outer end of each strip (71) being spaced a distance from the equatorial plane (EB71) comprised between 70% and 105% of half the tread width TW/2.

2. The tire of claim 1 wherein the crown reinforcing structure comprises two helically wound belt plies (24, 25) located between the at least one carcass ply (16) and the radially innermost spliced belt ply (23).

3. The tire of claim 2 wherein the crown reinforcing structure is staggered.

4. The tire of claim 2 wherein the width (EB1) of half the radially inner helically wound belt (25) is about 98% of half the tread width of TW/2; the width (EB2) of half the adjacent neighboring helically wound belt (24) is about 92% of TW/2; the width (EB3) of half the radially inner belt (23) is about 74% of TW/2; and the width (EB4) of half the radially outer belt (22) is about 70% of TW/2.

5. The tire of claim 1 wherein the crown reinforcing structure comprises one helically wound belt ply on top of the radially outermost spliced belt ply.

6. The tire of claim 5 wherein the lateral widths of the radially outermost helically wound belt ply (24) and width of the radially innermost helically wound belt ply (25) are about equal.

7. The tire of claim 1 wherein the adjacent spliced belt plies (22, 23) of the crown reinforcing structure have steel cords making an angle comprised between 45° and 75° with respect to the equatorial plane (EP), the steel cords in the adjacent plies having the same inclination but being opposed in angles with respect to the equatorial plane (EP).

8. The tire of claim 7 wherein the adjacent spliced belt plies (22, 23) have steel cords making an angle comprised between 55° and 65° with respect to the equatorial plane (EP).

9. The tire of claim 1 wherein the steel cords of the spliced belt plies have a lateral density of 10 to 12 ends per inch.

10. The tire of claim 1 wherein the steel cords (32) of the helically wound belts (24, 25) have the construction 3×7× 0.22 and wherein the lateral density of the cords in the helically wound belts is comprised between 12 and 16 ends per inch.

* * * * *